J. OPPENHEIM.
TYPE WRITING MACHINE.
APPLICATION FILED AUG. 18, 1900.

904,803.

Patented Nov. 24, 1908.

7 SHEETS—SHEET 3.

WITNESSES:

INVENTOR
James Oppenheim
BY
ATTORNEY

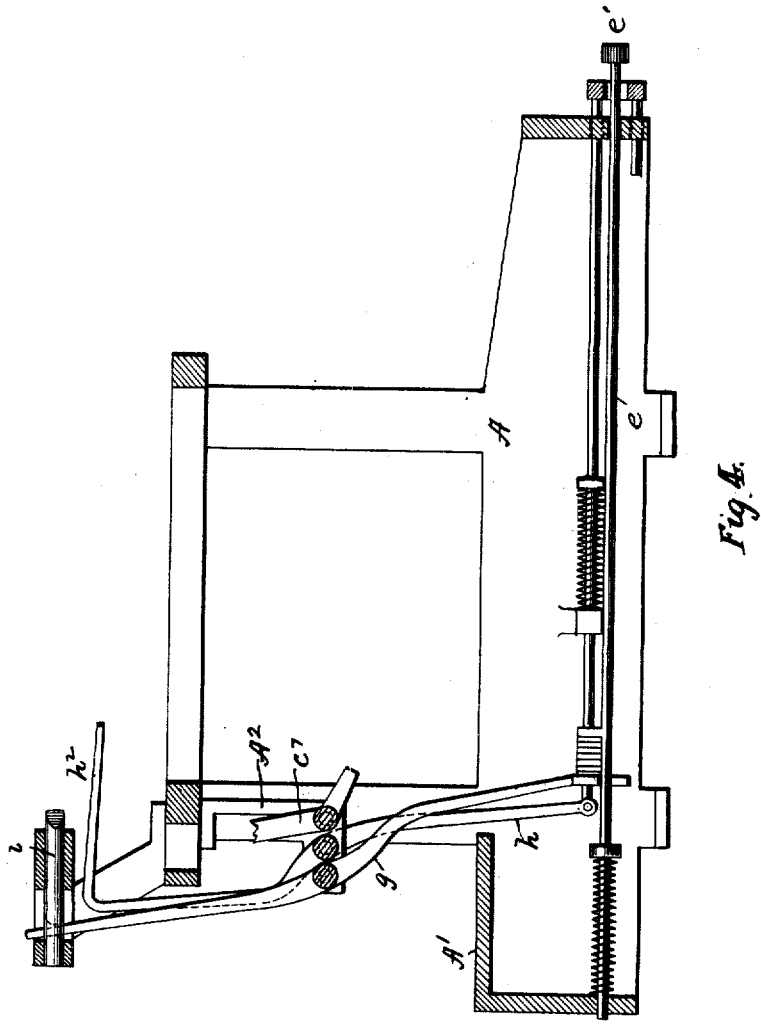

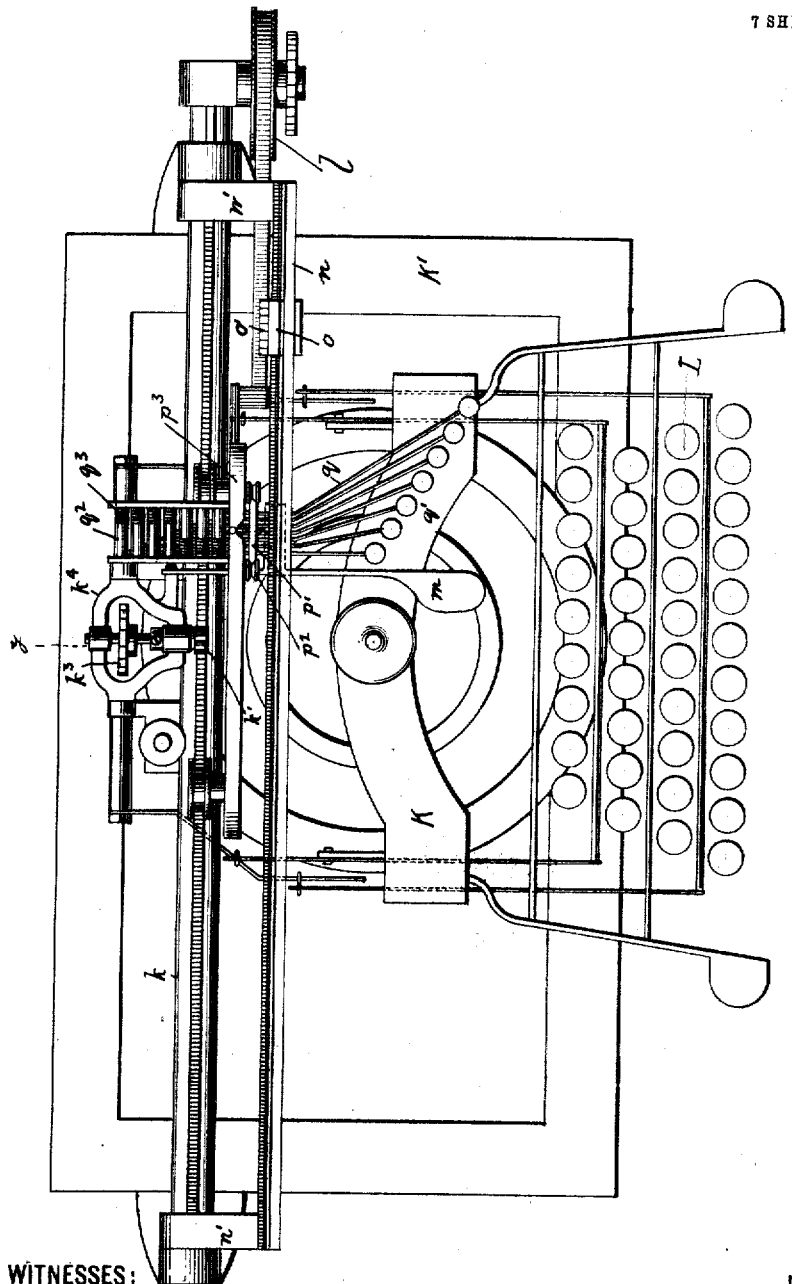

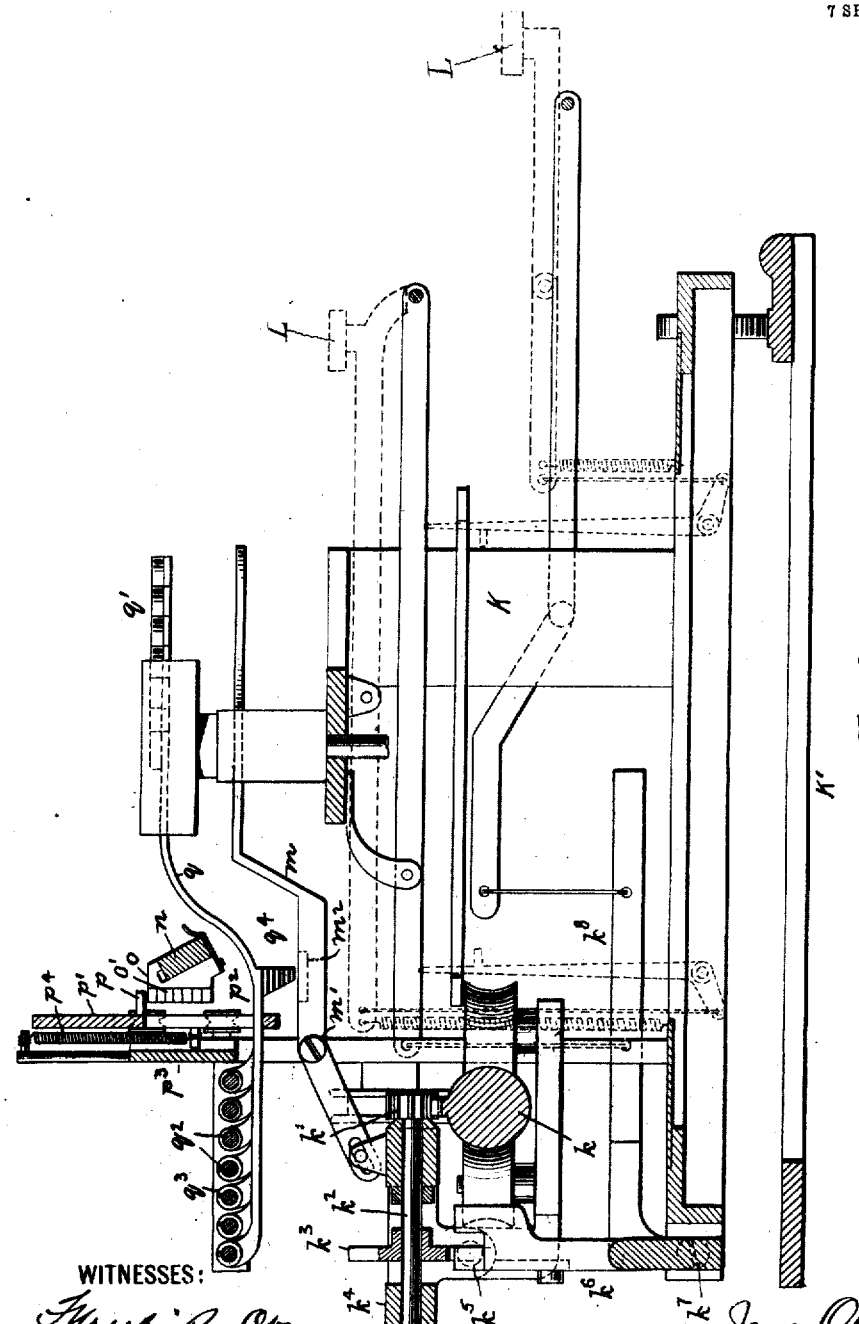

J. OPPENHEIM.
TYPE WRITING MACHINE.
APPLICATION FILED AUG. 18, 1900.
904,803.
Patented Nov. 24, 1908.
7 SHEETS—SHEET 7.
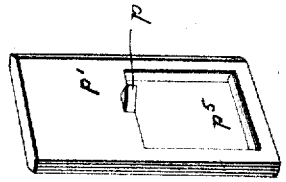
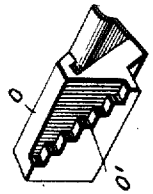
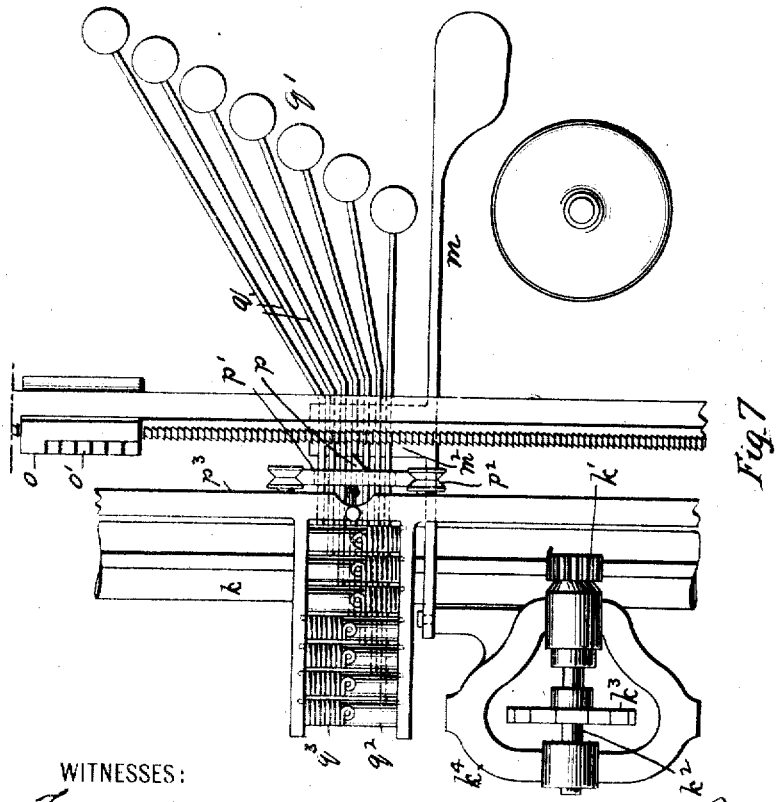
WITNESSES:
INVENTOR
James Oppenheim
BY
ATTORNEY

UNITED STATES PATENT OFFICE.

JAMES OPPENHEIM, OF NEW YORK, N. Y., ASSIGNOR TO UNION TYPEWRITER COMPANY, OF JERSEY CITY, NEW JERSEY, A CORPORATION OF NEW JERSEY.

TYPE-WRITING MACHINE.

No. 904,803.

Specification of Letters Patent.

Patented Nov. 24, 1908.

Application filed August 18, 1900. Serial No. 27,353.

*To all whom it may concern:*

Be it known that I, JAMES OPPENHEIM, a citizen of the United States, residing at the city of New York, in the borough of Manhattan and State of New York, have invented certain new and useful Improvements in Type-Writing Machines, of which the following is a full, clear, and exact description.

This invention relates to tabulating attachments for typewriting machines, the object being to provide a simple form of mechanism which can be easily attached to existing machines or constructed as a part of the machine itself, and by means of which the traveling portion of the machine can be instantly made to jump from any position in the line of writing to the exact position for writing the first figure or character, in a number or word to be located in a certain column of figures or words on the sheet. I accomplish these objects in the particular constructions shown by means of a graduated stop or stops adapted to be fixed at any desired point on the scale to determine the columnar field, in combination with a single plunger adapted to be thrust into the path of movement of the stop, a certain distance to engage with a certain graduation on the stop, by means of an associated one of a series of keys which are arranged to throw the plunger to respective graduated distances corresponding to the graduations on said stop.

The invention also consists of other combinations involving the carriage releasing devices, all of which will be fully hereinafter described and claimed.

To the above and other ends which will hereinafter appear, my invention consists of the features of construction, arrangements of parts and combinations of devices set forth in the following specification and particularly pointed out in the appended claims.

Figure 1:
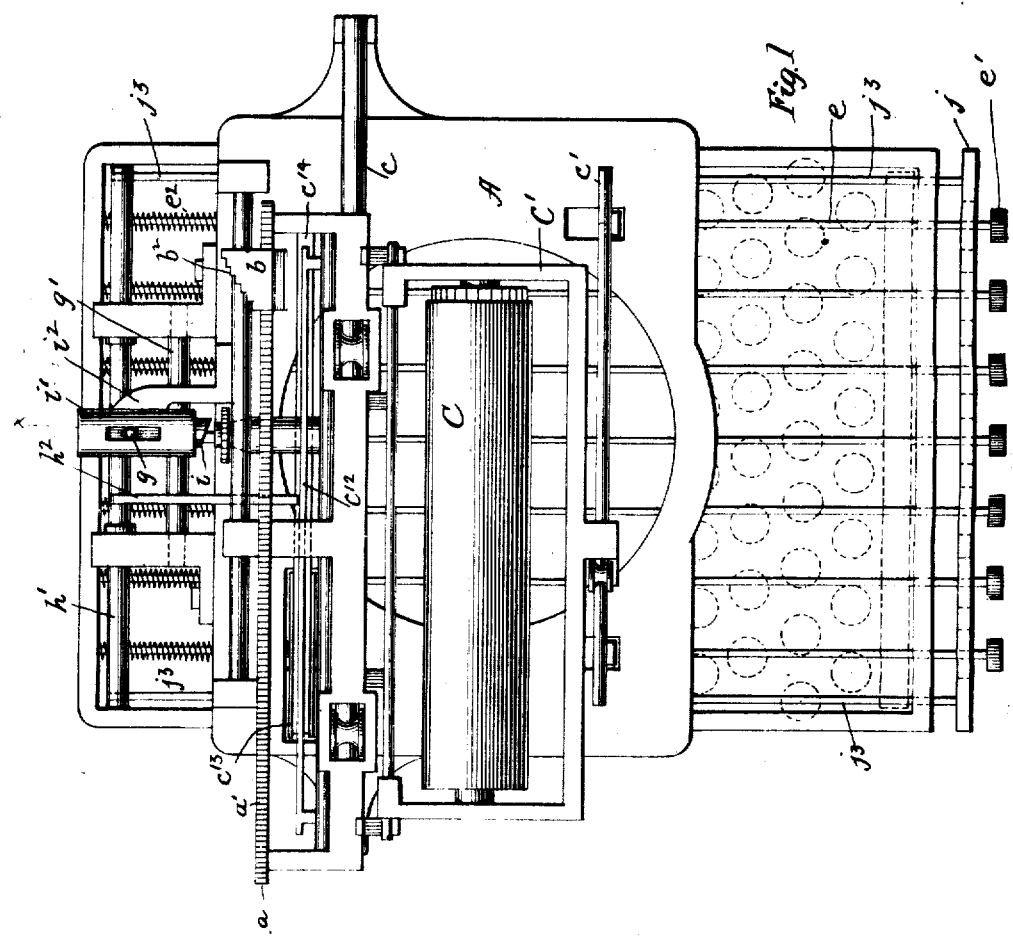
Figure 2:
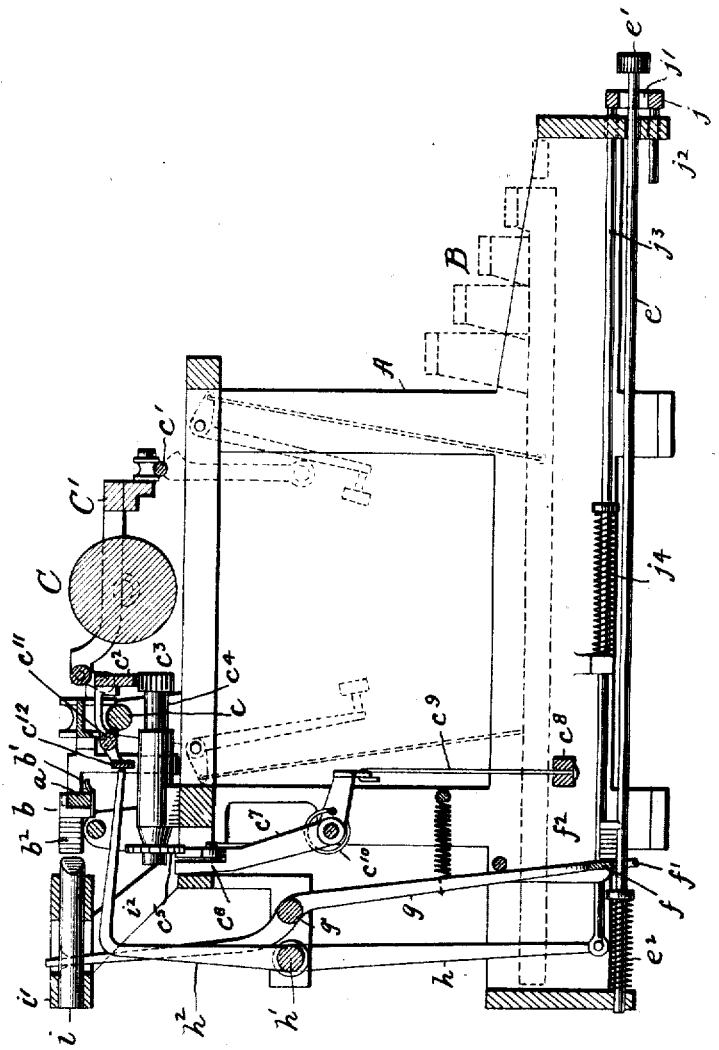
Figure 3:
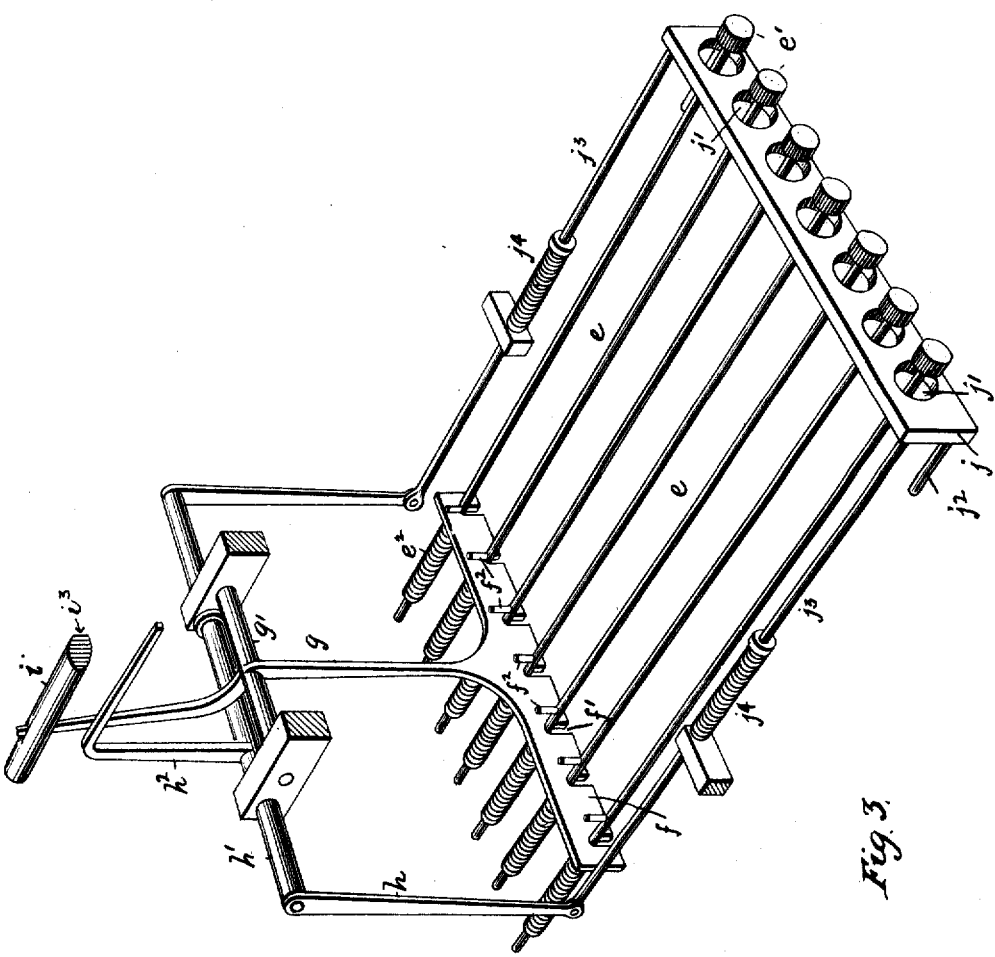

In the accompanying drawings: Figure 1 is a plan of one style of typewriting machine equipped with my improved tabulating device; Fig. 2 is a central, vertical, front to rear sectional view of the machine and including the releasing lever; Fig. 3 is a perspective view of the larger portion of the tabulating attachment; Fig. 4 is a fragmentary, vertical, front to rear, sectional view illustrating a slight modification of the tabulating attachment adapting it for a certain style of machine; Fig. 5 is a plan of a machine of another style, fitted with a tabulating attachment in accordance with my invention but modified to suit the particular style of machine; Fig. 6 is a vertical, front to rear sectional view of the construction shown in Fig. 5; Fig. 7 is an enlarged plan of the modified form of tabulating device; Fig. 8 is a detail of the detent or denominational selecting stop applying thereto; and Fig. 9 is a detail of the stepped or graduated stop.

In Figs. 1 to 4 the tabulating device is shown applied to the well-known Remington style of machine, wherein A indicates the frame, B the usual character keys and C the platen mounted in the carriage C' which traverses the rails $c$ and $c'$. Pivotally supported on the carriage is the usual feed rack $c^2$ which is engaged by the pinion $c^3$ for the usual step-by-step motion. The pinion is secured to the forward end of a shaft $c^4$ which carries an escape wheel $c^5$ operatively connected to the shaft and actuated by the feed dogs $c^6$ on the pivoted arm or dog rocker $c^7$, the arm being moved by the key levers through the usual universal bar $c^8$ and connecting links $c^9$, a restoring spring $c^{10}$ moving the parts back to normal position.

The feed rack $c^2$ is pivoted on the shaft $c^{11}$ from which I have extended rearward suitable arms supporting a release bar $c^{12}$ extending the width of the carriage. The rack can be lifted out of engagement with the pinion by pushing the bar $c^{12}$ forward and downward, the carriage being then free to traverse its rails under the action of the usual spring drum $c^{13}$ and steel tape $c^{14}$.

At the rear of the carriage I provide a stop bar $a$ having a serrated face $a'$ and upon which is marked a scale corresponding to the usual scale at the front of the machine. Upon this bar may be secured one or more detachable blocks $b$ which I shall hereinafter refer to as stops. The stop is undercut and provided with internal serrations which engage with those on the bar and by the aid of the spring clip $b'$ which are bent as indicated in Fig. 2 to engage under one corner or edge of the stop bar to hold the stop against accidental detachment at any point on the bar where the stop may be located. The rear side of the stop is inclined in a direction ranging from right to left, and this incline is divided off into a series of steps or denominational stops $b^2$ presenting shoulders at graduated distances from an innermost position near the bar $a$ to an outermost position, depending upon the number of steps in the series, seven being the number shown. Each of these steps, in the direction of the feed of the carriage, is in length equal to one space on the scale, so that the seven steps shown will cover a space along the line of writing sufficient to write any amount less than ten million. By increasing the number of steps or denominational stops in the series larger amounts may be written.

Underneath the machine and mounted in a suitable framework attached to the main frame is a series of horizontal push rods or denomination-selecting rods or devices $e$, each projecting through suitable bearings in the front part of the frame below the main keyboard, and carrying a button, key or finger piece $e'$ against which the operator may press his finger to force the rods inward. At their inner end portions the rods are provided with expansion springs $c^2$ which return them to their normal or outer positions, each spring bearing at one end against the frame of the machine and at its opposite end against a collar secured to the associated push rod. Near their rear ends the rods pass through openings or notches $f'$ in a bar $f$ which stands at right angles to the rods, and each rod carries a pin or projection $f^2$ standing in front of the bar and arranged from right to left at gradually increasing distances from the bar. The bar is carried by an upwardly extending lever $g$ pivoted on the axis $g'$ in a portion of the frame, and engaging at its upper end with a plunger $i$ arranged in a fore-and-aft position at the middle and back of the machine.

The plunger, which I shall hereinafter refer to as the detent, tabulating or denominational selecting stop, is mounted in a cylindrical bearing $i'$ strongly supported by a bracket $i^2$ attached to the main frame. The bearing has an opening in which the end of the lever $g$ can vibrate, and the detent has an opening in which the lever fits in a manner permitting of the required movement. The stop $i$ is located in the same horizontal plane as the stop $b$, and its forward end is provided with a flat working face or surface $i^3$, which in the operation of the device is struck by one of the shoulders on the stop $b$.

The forward ends of the push rods $e$ project respectively through openings or perforations $j'$ in a bar $j$ arranged in front of the main frame. These openings are just large enough to allow the buttons $e'$ to pass into them. The buttons are somewhat smaller than the end of the finger of the operator, so that when a push rod is forced inward, the finger of the operator finally comes in contact with the bar and in the last part of the stroke the bar is thus made to accompany the button and the rod. To facilitate this movement of the bar in common for any of the keys, it is provided at each end with guide rods $j^2$ entering bearing apertures in the frame. It is also similarly guided by other rods $j^3$ at each end which extend through the frame and to the rear of the machine where they are hinged to the downwardly turned ends of a bail $h$ having an axis $h'$ mounted in the frame. To the axis is fixed a bent arm $h^2$ reaching to a point immediately back of the release bar $c^{12}$ on the carriage. It will be seen that by these connections an inward motion imparted to the key bar $j$ will cause the arm $h^2$ to strike the bar $c^{12}$ and lift the feed rack out of engagement with the feed pinion $c^3$, thus disengaging the carriage from its feeding devices. These connections are returned to their normal positions after the pressure of the finger is removed, by springs $j^4$, each of which surrounds a rod $j^3$ and bears at one end against a projection from the frame of the machine and at the other end against a collar on the associated rod $j^3$.

The operation can now be explained. Suppose it is desired to write a bill, statement or other document containing a column of figures. One of the stops $b$ is adjusted to the scale bar $a$ in such a position that its outermost step or shoulder $b^2$ will be opposite that point on the scale corresponding to the point in the line of writing where the "units" column of figures is to occur in order to determine the columnar field; i. e., if the units column is to occur at letter space 55 of the line of writing, the stop will be adjusted so that the most rearward or outer step or shoulder will be opposite point 55 of the scale on the stop bar $a$. This will bring the innermost step or shoulder opposite point 48 of the scale because there are seven denominational stops on the stop member $b$. The seventh position from the "units" is "millions." Hence, if the carriage is brought to a stop at 48 on the scale, any amount in millions less than 10 can be printed at that point.

Let us now assume that, having written in a line a certain item, it is desired to have the carriage jump at once to the proper position, for writing in the column the amount 7,564,326. At the end of the written item the operator will push the button $e'$ marked "millions" (which is the one on the extreme right, the others being marked "hundred thousands", "ten thousands", etc., to "units"), inward as far as it will go. Since the pin $f^2$ on this rod is the nearest one to the bar $f$, (and in fact it may be actually against the bar) the bar immediately swings and accompanies the entire motion of the rod, the result of which is that the detent or denominational selecting stop $i$ is thrust forward as far as it can go, or to a position where its contact surface or point $i^3$ will be in the path of movement of the innermost step—the one located at 48 on the scale of the stop rod—of the stop $b$.

During the last part of the traverse of the button $e'$, the finger of the operator engages with the common key bar $j$ and moves it inward, so that just as the detent reaches its intended position, the carriage is released from its feeding devices and the spring quickly moves the carriage to the left until it is detained at the letter space position 48 by the engagement of the inner step of the stop $b$ with the point of the detent. Upon releasing the push rod $e$, the detent returns to its normal retracted position, the feed rack again engages the feed pinion and the carriage is held until the operator strikes the "7" printing key, whereupon the carriage feeds as usual to the next space (49) and the operator strikes the "5" key, and so on, until all of the figures in the amount have been written. Other written matter may finish out the line, or, other amounts written in the same manner, by the aid of other stops $b$ placed at successive positions on the scale. If, in writing the next line of the document, the amount to be written in the first column is 903, the operator, when ready, will press the button $e'$ marked "hundreds", whereupon, the detent will be thrust forward to a position where its point will engage with the step opposite the 53 mark on the scale and the carriage will be there arrested. The operator will then write the amount 903 as before. Thus any amounts below 10 million can be readily written in columns by a stop constructed as described. For larger amounts, the carriage can be set back one or more points after jumping to the "million" position, or stops with more steps $b^2$ can be used.

The modification illustrated in Fig. 4 is to adapt the devices above described to existing machines of the same type, wherein the rear ends of the bank of key levers are covered by a frame plate $A'$. This modification merely consists in pivoting the lever $g$, the bail $h$ and the feeding lever $e^7$ in a single bracket $A^2$, and bending the lever $g$ and bail to pass downward in front of the cover plate $A'$.

In Figs. 5 to 9, I have illustrated my invention applied to what is known as the "book typewriter" or flat platen machine, in which the entire printing mechanism travels along the line of writing while the paper or book remains stationary on a fixed platen, the "carriage" in this case carrying the printing instrumentalities. In these figures K indicates the frame of the carriage and K' the stationary frame containing the platen. L indicates the character keys. The feed rack in this case is stationary and consists of a rod $k$ having a rack on its upper surface which is engaged by a pinion $k'$ on a shaft $k^2$, the shaft carrying escape wheel $k^3$ and being mounted in a frame $k^4$ pivoted at $k^5$ to the carriage. The feed dogs are at the upper end of arm or dog rocker $k^6$ pivoted to the carriage at $k^7$, and having a projection $k^8$ which is lifted by the character keys whenever they are struck. To disconnect the feeding devices from the rack, so as to permit the carriage to move freely under the pull of the spring drum $l$, the frame $k^4$ is tilted by means of the lever $m$ pivoted to the carriage at $m'$ and engaging with the frame $k^4$ by means of a pin and slot.

The regular scale bar of the machine is indicated at $n$; it is stationary and supported by brackets $n'$. To this scale bar I attach the stop or stop members $o$ similar in construction to the stop $b$ of the other machine, except that the steps or denomination stops $o'$ are in a vertical plane, the intention being to set the lowest step at the "million" position in the column and the highest step at the "units" position.

The detent or denominational selecting stop is in the form of a lug $p$ projecting from a rectangular frame $p'$ mounted to slide vertically between guide wheels $p^2$ on a part $p^3$ of the frame. A spring $p^4$ holds the frame in its normal elevated position. Denominational tabulator keys corresponding to keys $e$ in the other machine are indicated by $q$; each is provided with a button $q'$, upon which the words "units", "tens", "hundreds", etc., will be marked, from right to left. These levers operate by depression and they all pass through an opening $p^5$ in the frame $p'$, standing just above the lower member of said frame, and are attached respectively to pivotal shafts $q^2$ mounted one behind the other in a rearward extension from the frame $p^3$. Each of the shafts is acted upon by a spring $q^3$ which holds the lever in its elevated position. The buttons $q'$ are arranged in an oblique row so that they will stand above a certain portion of the frame, as shown in Fig. 5.

From the under side of each lever $q$ there projects a lug $q^4$, said lugs being of graduated lengths, the shortest being at the left, and immediately beneath these, is a lateral extension $m^2$ of the release lever $m$.

The operation as far as it is necessary to describe, is as follows: The keys $q$ all have the same length of stroke, but their pivotal points being arranged at increasing distances beyond the frame $p'$, said frame will be moved downward a different distance by each lever, so that each lever is capable of setting the denominational selecting stop or detent $p$ opposite a different denominational stop of the stop member $o$. When an amount in the millions is to be written, the detent is moved to the lowest point by pressing on the key to the right marked "million". Near the end of the stroke of the key the lug $q^4$ strikes and moves the release lever $m$ and the carriage is permitted to jump until it is stopped by the detent coming into contact with the lowest step of the stop $o$. The first figure in the amount is then printed and the others following it as before described.

The essential difference between the mechanism just described and that first described is the fact that in the first machine a separate key is used for releasing the carriage, such key being independently operated by the finger of the operator, while in the device attached to the "book typewriter" each of the keys for setting the stopping mechanism is also capable of releasing the carriage.

When a separate key is used for the release it is evident that it may be manipulated by another finger of the operator, if desired. This form can be applied in Fig. 7 by dispensing with the extension $m^2$ and simply pressing down on the lever $m$ while still holding down one of the keys $q$.

It is to be understood that the stops $b$ or $o$ with their "steps" or stops $b^2$ and $o'$ may have their equivalents in various other specific forms; they might, for instance, be in the form of pins or lugs projecting from a single block or stop member or they might be inserted in individual holes in the scale bar or otherwise attached thereto independently of each other, the generic idea being that the stop, as a whole, shall comprise a series of shoulders or abutments differently placed so that a single detent may be brought into line with any one of them to stop the carriage at a certain point on the line of writing and this is what is meant by the expression "graduated stop" in the claims which follow.

From the foregoing description, it will be seen that the steps, shoulders or abutments of the so-called graduated stop constitute a series of denominational stops, whereas the single coöperating detent constitutes a tabulating stop and the various keys for affording an arrest of the carriage at a predetermined point constitute tabulating or denominational keys.

Having described my invention, I claim:

1. In a typewriting machine, the combination of a carriage, step by step feeding devices therefor, a stop and a detent, one located on the carriage and the other on a fixed frame, said stop being graduated and said detent being movable to different positions to engage with the various graduations of the stop, a series of keys respectively adapted to move said detent to its various positions and means for disconnecting the feeding devices consisting of a key arranged to be struck by the finger of the operator while it is pressing against one of the other keys, substantially as described.

2. In a typewriting machine, the combination of a carriage, key-actuated tabulating mechanism including a stop carried by the carriage, and independent key-actuated carriage releasing mechanism, the carriage release key being located in the path of movement of and adapted to be moved directly by the finger of the operator during the actuation of a tabulating key.

3. In a typewriting machine and tabulating mechanism, the combination of a series of stepped denominational stops, a single stop adapted to be moved different degrees to coöperate with said series of stepped stops, a universal bar connected with said variably movable stop, a series of key-actuated bars, and means between said universal bar and said series of key-actuated bars for putting into motion said universal bar at varying times in the strokes of the said key actuated bars and causing the stop connected therewith to be moved different degrees according to the particular key-actuated bar manipulated.

4. In a typewriting machine and tabulating mechanism, the combination of a carriage, a series of stepped stops, a single stop movable different degrees to coöperate therewith, a series of denominational keys, means between said keys and said single stop for variably moving the latter, and carriage releasing means operated in conjunction with any of said keys or independently thereof.

5. In a typewriting machine and tabulating mechanism, the combination of a carriage, denominational determining stops adjustably fixed to the part which carries them, a tabulating stop, one being carried by the carriage and the other by a relatively fixed portion of the machine, a series of tabulator keys for projecting the tabulating and denominational stops one in the path of the other, and independent key actuated means for releasing the carriage, and which may be operated in conjunction with any of said keys or independently thereof at will.

6. In a typewriting machine and tabulating mechanism, the combination of a carriage, denominational stops, a coöperating tabulating stop which is adapted to move to different extents and into the path of the different denominational stops, a series of independent tabulating keys which are adapted to move the said tabulating stop to different extents, and independent means which are operable in conjunction with and independently of said tabulating keys to effect a release of the carriage.

7. In a typewriting machine and tabulating mechanism, the combination of a carriage, denominational stops carried thereby, a tabulating stop which slides in a bearing in a fixed portion of the machine, a frame operatively connected to said tabulating stop, a series of key actuated push rods which are adapted to move said frame to different extents to move the tabulating stop into coöperation with the various denominational stops, carriage releasing mechanism and a key for actuating it, said key being so situated with relation to the keys of the push rods that the actuation of any one of them will bring the finger of the operator into contact with the carriage release key to release the carriage.

8. In a typewriting machine and tabulating mechanism, the combination of a carriage, a tabulating stop, a series of key actuated push rods, a series of projections on said push rods arranged at different points in the lengths thereof, a bar with which said projections are adapted to contact to move it to different extents, a second coöperating tabulating stop and intermediate connections between said bar and said last mentioned stop.

9. In a typewriting machine and tabulating mechanism, the combination of a carriage, denominational stops thereon, a series of key actuated push rods, a series of projections on said push rods arranged at different points in the lengths thereof, a bar with which said projections are adapted to contact to move it to different extents, a tabulating stop carried by the frame of the machine, and intermediate connections between said bar and said last mentioned stop to move it to different positions and into the paths of the various denominational stops on the carriage.

10. In a typewriting machine and tabulating mechanism, the combination of a carriage, denominational stops carried by the carriage, a coöperating tabulating stop carried by the frame of the machine, push rods which are adapted to move the tabulating stop to different extents and into the paths of the different denominational stops, an apertured bar through which said push rods project, and carriage releasing mechanism operatively connected to said apertured bar.

11. In a typewriting machine and tabulating mechanism, the combination of a carriage, denominational stops carried by the carriage, a coöperating tabulating stop carried by the frame of the machine, said denominational and tabulating stops being adjustable one relatively to the other, push rods which are adapted to move the tabulating stop to different extents and into the path of the different denominational stops, finger keys on said push rods, an apertured bar through which said push rods and finger keys project, and carriage releasing mechanism operatively connected to said apertured bar.

12. In a typewriting machine and tabulating mechanism, the combination of a carriage, a step-shaped denominational stop carried at the rear of the carriage, and adjustable thereon, a bracket carried by the frame of the machine at the rear portion thereof, a bearing carried by said bracket, a tabulating stop adapted to slide in said bearing in a direction transverse to the run of the carriage and into the path of the different steps on the denominational stop, a series of denominational keys below the keyboard of the machine, intermediate mechanism between said keys and the tabulating stop to move it variable distances and into the path of the different steps on the denominational stop, and means which afford a release of the carriage on the actuation of any of said keys.

13. In a typewriting machine and tabulating mechanism, the combination of a carriage, a step-shaped denominational stop carried at the rear of the carriage, and adjustable thereon, a bracket carried by the frame of the machine at the rear portion thereof, a bearing carried by said bracket, a tabulating stop adapted to slide in said bearing in a direction transverse to the run of the carriage and into the path of the different steps on the denominational stop, a bar connected to said tabulating stop, a series of push rods which are adapted to bear upon said bar and move it to different extents, a release key that is adapted to be moved after an initial movement of any of the push rods has been effected, and carriage releasing devices connected to said release key.

14. In a tabulator for typewriters, the combination with a suitable stop means and a series of keys for actuating the same to stop the carriage in proper position for the arrangement of a column of figures, of a transverse release bar perforated for the free passage of the tabulator keys; connections from said bar to the carriage feed mechanism whereby the carriage may be released to permit it to move into contact with the stop, as specified.

15. In a typewriting machine, the combination of a carriage, a bar with a series of perforations therein, said bar controlling the release of the carriage, and denominational tabulating mechanism comprising a series of independently operable denomination selecting rods in register with said perforations, the parts being so arranged that a finger of an operator may actuate both a denomination selecting rod and said bar.

16. In a typewriting machine, the combination of a carriage, a bar operable to release the carriage, and denominational selecting devices ranging along said bar, so that a finger of an operator may actuate one of said denominational selecting devices to control the denominational position of arrest of the carriage and may at the same operation bear directly on said bar to release the carriage.

17. The combination with a carriage, tabulating mechanism including independently operable push rods and denominational stop devices controlled thereby, a bar with a series of perforations therein each of which receives one of said push rods, an index mark for each push rod, and means controlled by said bar for releasing the carriage.

18. The combination with a carriage, of a series of denomination selecting devices, a finger bar extending along said series, and means for enabling said finger bar to coöperate with any of said denomination selecting devices for releasing the carriage and arresting it at the required denominational position by the concurrent operation of said finger bar and a denominational selecting device, said finger bar being so related to said denomination selecting devices that as a consequence of a finger of the operator being moved to actuate any denomination selecting device a concurrent operation of said device and finger bar will be effected.

19. A stop rod, and a tabulator stop detachably carried by said rod, said stop having a spring formed to engage under one corner or edge of the rod and to prevent an accidental detachment of the stop from the rod.

20. A stop rod having teeth, a tabulator stop detachably carried by said rod and engaging the teeth thereon, and a spring secured to said stop and engaging under one corner or edge of the bar to hold the stop engaged with the teeth on the bar and to prevent an accidental detachment of the stop from the bar.

21. In a typewriting machine, the combination of, a carriage; feeding devices therefor; denominational tabulating mechanism including a variably movable tabulating stop and tabulator keys; and means for disconnecting the feeding devices, said disconnecting means comprising a release key arranged to be struck directly by the finger of the operator while it is pressing one of the tabulator keys, and connections from said release key to the feeding devices.

22. In a typewriting machine and tabulating mechanism, the combination of a carriage; stops carrried by the carriage; a coöperative stop movable different distances to determine the denominational position of arrest of the carriage; a series of keys for actuating said coöperative stop; and independent key actuated means for releasing the carriage and which may be operated in conjunction with any of said keys or independently thereof.

23. In a typewriting machine, the combination of a carriage; key actuated tabulating mechanism including a stop movable variable distances to determine the position of arrest of the carriage; and independent key controlled carriage release mechanism, the key of which is in the path of movement of and is moved directly by the finger of the operator during the actuation of a tabulating key.

24. In a typewriting machine, the combination of a carriage; tabulating mechanism including a stop movable variable distances to determine the position of arrest of the carriage; a series of keys for variably moving said stop; carriage releasing mechanism; a single key for actuating said carriage releasing mechanism, the tabulating and carriage releasing keys being so related that an actuation of a tabulating key will necessarily bring the finger of the operator into contact with the carriage release key and afford an actuation of the carriage releasing mechanism.

25. In a typewriting machine, the combination of a carriage; a series of stops; a coöperating tabulating stop; a plurality of denominational keys for moving said series of stops and the coöperating stop one into the path of the other and for effecting a variation in the extent of such movement, carriage releasing mechanism; a key for actuating said releasing mechanism, the denominational keys being so related to the carriage release key that an actuation of the former will necessarily bring the finger of the operator into contact with the carriage release key and release the carriage.

26. In a typewriting machine, the combination of a series of stops; a coöperative stop movable variably to determine the denominational position of arrest of the carriage; a bar connected with said variably movable stop; actuating devices having contact portions that are normally situated at varying distances from said bar; keys for said actuating devices; and carriage releasing mechanism including a perforated release bar, the perforations in which are coincident with said keys.

In witness whereof, I subscribe my signature, in presence of two witnesses.

JAMES OPPENHEIM.

Witnesses:
Wm. A. Rosenbaum,
Frank S. Ober.